United States Patent
Reisacher et al.

(10) Patent No.: US 7,172,653 B2
(45) Date of Patent: Feb. 6, 2007

(54) SOLID PIGMENT PREPARATIONS COMPRISING SURFACE-ACTIVE ADDITIVES BASED ON ALKOXYLATED BISPHENOLS

(75) Inventors: Hansulrich Reisacher, Maxdorf (DE); Michael Kluge, Ludwigshafen (DE)

(73) Assignee: BASF Aktiengesellschaft, Ludwigshafen (DE)

(*) Notice: Subject to any disclaimer, the term of this patent is extended or adjusted under 35 U.S.C. 154(b) by 117 days.

(21) Appl. No.: 10/526,437

(22) PCT Filed: Sep. 12, 2003

(86) PCT No.: PCT/EP03/10151

§ 371 (c)(1), (2), (4) Date: Mar. 3, 2005

(87) PCT Pub. No.: WO2004/029159

PCT Pub. Date: Apr. 8, 2004

(65) Prior Publication Data

US 2005/0261405 A1  Nov. 24, 2005

(30) Foreign Application Priority Data

Sep. 24, 2002 (DE) .................. 102 44 683

(51) Int. Cl.
- C08K 5/00 (2006.01)
- C04B 14/00 (2006.01)
- C09D 11/00 (2006.01)

(52) U.S. Cl. .......... 106/499; 106/31.6; 106/31.89; 106/400

(58) Field of Classification Search ......... 106/31.6, 106/31.89, 400, 499
See application file for complete search history.

(56) References Cited

U.S. PATENT DOCUMENTS

| | | | |
|---|---|---|---|
| 4,056,402 A | | 11/1977 | Guzi, Jr. |
| 4,108,798 A | * | 8/1978 | Sze et al. .......... 252/502 |
| 4,127,422 A | | 11/1978 | Guzi, Jr. |
| 4,420,310 A | * | 12/1983 | Opitz et al. .......... 8/560 |
| 5,082,498 A | * | 1/1992 | Kurtz et al. .......... 106/499 |
| 5,782,965 A | * | 7/1998 | Ishida et al. .......... 106/31.33 |
| 5,795,376 A | * | 8/1998 | Ide .......... 106/31.73 |

FOREIGN PATENT DOCUMENTS

| | | | |
|---|---|---|---|
| DE | 27 30 233 | | 1/1979 |
| DE | 199 05 269 | | 8/2000 |
| DE | 102 04 304 | | 8/2003 |
| DE | 102 04 583 | | 8/2003 |
| DE | 102 27 657 | | 1/2004 |
| DE | 102 28 199 | | 1/2004 |
| EP | 0 013 576 | | 7/1980 |
| EP | 0 084 645 | | 8/1983 |
| EP | 0 403 917 | | 12/1990 |
| EP | 0 655 527 | | 5/1995 |
| EP | 1 081 195 | | 3/2001 |
| EP | 1 103 173 | | 5/2001 |
| JP | 60-141768 | * | 7/1985 |
| JP | 06-025583 | * | 2/1994 |
| JP | 11-035882 | * | 2/1999 |
| WO | 02 068504 | | 9/2002 |

* cited by examiner

*Primary Examiner*—Karl Group
*Assistant Examiner*—Patricia L. Hailey
(74) *Attorney, Agent, or Firm*—Oblon, Spivak, McClelland, Maier & Neustadt, P.C.

(57) ABSTRACT

The invention related to solid pigment preparations essentially comprising the following components: (A) 60 to 90 wt. % of at least one pigment and (B) 10 to 40 wt. % of at last one surface active additive from the group of reaction products of alkylene oxides with a bisphenol of the general formula (I) in which the rings A are each mono- or di-substituted by $C_1$–$C_8$ alkyl, phenyl or phenyl $C_1$–$C_9$ alkyl and $R^1$ and $R^2$ independently=H, or $C_1$–$C_8$ alkyl, methods for production thereof and for dyeing high molecular weight organic and inorganic materials

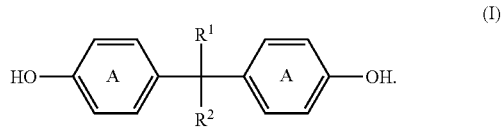

(I)

10 Claims, No Drawings

SOLID PIGMENT PREPARATIONS COMPRISING SURFACE-ACTIVE ADDITIVES BASED ON ALKOXYLATED BISPHENOLS

DESCRIPTION

The present invention relates to solid pigment preparations comprising as essential constituents
(A) from 60 to 90% by weight of at least one pigment and
(B) from 10 to 40% by weight of at least one surface-active additive from the group of the reaction products of alkylene oxides with a bisphenol of the general formula I

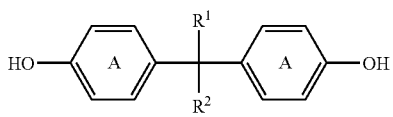

where the rings A may each be substituted by one or two substituents selected from the group consisting of $C_1$–$C_8$-alkyl, phenyl and phenyl-$C_1$–$C_8$-alkyl and $R^1$ and $R^2$ are independently hydrogen or $C_1$–$C_8$-alkyl.

The present invention further relates to the production of these pigment preparations and to their use for pigmenting macromolecular organic and inorganic materials.

Liquid systems such as coatings, varnishes, emulsion paints and printing inks are customarily colored using pigment formulations which include water, organic solvent or mixtures thereof. As well as anionic, cationic, nonionic or amphoteric dispersants, these pigment formulations generally have to be additized with further assistants, such as dried-crust inhibitors, freeze resistance enhancers, thickeners and anti-skinners, for stabilization.

There is a need for novel pigment preparations which are comparable to the liquid formulations with regard to color properties and dispersibility, but do not require the additions mentioned and are easier to handle. However, simply drying the liquid formulations does not provide solid pigment preparations having comparable performance properties.

DE-A-199 05 269 describes solid pigment formulations which include dispersants based on nonionic or ionic modified phenol-styrene polyglycol ethers or mixtures of ethoxylated castor oil with minor amounts of these ethers or of phosphonic esters and additionally always a thickener based on optionally partially hydrogenated polyvinyl alcohol or on anionic polyhydroxy compounds and are used for pigmenting waterborne application media.

EP-A-84 645 and 403 917 disclose highly concentrated, solid pigment formulations for coloring aqueous, alcoholic and aqueous-alcoholic coatings and printing inks that include up to 30% by weight of an additive based on reaction products of at least bifunctional amines with propylene oxide and ethylene oxide.

U.S. Pat. Nos. 4,056,402 and 4,127,422 describe dry nondusting pigment compositions for waterborne finish systems. However, these pigment compositions, as well as nonionic dispersants, include as an essential constituent at least 10% by weight of water-soluble cellulose ethers or of water-dispersible polyvinyl compounds and hence differ from the pigment preparations of the present invention.

EP-A-1 081 195 discloses granular pigment preparations for pigmenting plastics. These pigment preparations include nonionic polyethylene wax additives and are produced by contacting the pigments with the waxes in the course of solvent finishing and spray drying. However, this production process is only useful for organic pigments which are finished in organic solvents.

Finally, the documents DE-A-102 04 304 and also 102 04 583, 102 27 657 and 102 28 199, each unpublished at the priority date of the present invention, describe the use of solid pigment preparations which include nonionic surface-active additives based on polyethers or mixtures of these additives with anionic surface-active additives based on appropriately modified polyethers.

It is an object of the present invention to provide solid pigment preparations having altogether advantageous application properties, especially high color strength and particularly good stir-in dispersibility in a wide variety of application media and also high stability in storage.

We have found that this object is achieved by the pigment preparations defined at the beginning.

The present invention further provides a process for producing pigment preparations which comprises wet-comminuting the pigment (A) in aqueous suspension in the presence of some or all of additive (B) and then drying the suspension, if necessary after the rest of additive (B) has been added.

The present invention yet further provides a process for pigmenting macromolecular organic or inorganic materials, which comprises introducing the pigment preparations into these materials by stirring or shaking.

The pigment preparations of the present invention include as essential constituents a pigment (A) and a surface-active additive (B).

Component (A) in the pigment preparations of the present invention may be an organic pigment or an inorganic pigment. It will be appreciated that the pigment preparations may also include mixtures of various organic or various inorganic pigments or mixtures of organic and inorganic pigments.

The pigments are present in finely divided form. Accordingly the pigments typically have average particle sizes from 0.1 to 5 μm, especially from 0.1 to 3 μm and in particular from 0.1 to 1 μm.

The organic pigments are typically organic chromatic and black pigments. Inorganic pigments can likewise be color pigments (chromatic, black and white pigments) and also luster pigments and the inorganic pigments typically used as fillers.

There now follow examples of suitable organic color pigments:

monoazo pigments:
    C.I. Pigment Brown 25;
    C.I. Pigment Orange 5, 13, 36, 38, 64 and 67;
    C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251;
    C.I. Pigment Yellow 1, 3, 62, 65, 73, 74, 97, 120, 151, 154, 168, 181, 183 and 191;
    C.I. Pigment Violet 32;

disazo pigments:
    C.I. Pigment Orange 16, 34, 44 and 72;
    C.I. Pigment Red 144, 166, 214, 220, 221 and 242;
    C.I. Pigment Yellow 12, 13, 14, 16, 17, 81, 83, 106, 113, 126, 127, 155, 174, 176, 180 and 188;

disazo condensation pigments:
  C.I. Pigment Yellow 93, 95 and 128;
  C.I. Pigment Red 144, 166, 214, 220, 242 and 262;
  C.I. Pigment Brown 23 and 41;
anthanthrone pigments:
  C.I. Pigment Red 168;
anthraquinone pigments:
  C.I. Pigment Yellow 147, 177 and 199;
  C.I. Pigment Violet 31;
anthrapyrimidine pigments:
  C.I. Pigment Yellow 108;
quinacridone pigments:
  C.I. Pigment Orange 48 and 49;
  C.I. Pigment Red 122, 202, 206 and 209;
  C.I. Pigment Violet 19;
quinophthalone pigments:
  C.I. Pigment Yellow 138;
diketopyrrolopyrrole pigments:
  C.I. Pigment Orange 71, 73 and 81;
  C.I. Pigment Red 254, 255, 264, 270 and 272;
dioxazine pigments:
  C.I. Pigment Violet 23 and 37;
  C.I. Pigment Blue 80;
flavanthrone pigments:
  C.I. Pigment Yellow 24;
indanthrone pigments:
  C.I. Pigment Blue 60 and 64;
isoindoline pigments:
  C.I. Pigment Orange 61 and 69;
  C.I. Pigment Red 260;
  C.I. Pigment Yellow 139 and 185;
isoindolinone pigments:
  C.I. Pigment Yellow 109, 110 and 173;
isoviolanthrone pigments:
  C.I. Pigment Violet 31.;
metal complex pigments:
  C.I. Pigment Red 257;
  C.I. Pigment Yellow 117, 129, 150, 153 and 177;
  C.I. Pigment Green 8;
perinone pigments:
  C.I. Pigment Orange 43;
  C.I. Pigment Red 194;
perylene pigments:
  C.I. Pigment Black 31 and 32;
  C.I. Pigment Red 123, 149, 178, 179, 190 and 224;
  C.I. Pigment Violet 29;
phthalocyanine pigments:
  C.I. Pigment Blue 15, 15:1, 15:2, 15:3, 15:4, 15:6 and 16;
  C.I. Pigment Green 7 and 36;
pyranthrone pigments:
  C.I. Pigment Orange 51;
  C.I. Pigment Red 216;
pyrazoloquinazolone pigments:
  C.I. Pigment Orange 67;
  C.I. Pigment Red 251;
thioindigo pigments:
  C.I. Pigment Red 88 and 181;
  C.I. Pigment Violet 38;
triarylcarbonium pigments:
  C.I. Pigment Blue 1, 61 and 62;
  C.I. Pigment Green 1;
  C.I. Pigment Red 81, 81:1 and 169;
  C.I. Pigment Violet 1, 2, 3 and 27;
C.I. Pigment Black 1 (aniline black);
C.I. Pigment Yellow 101 (aldazine yellow);
C.I. Pigment Brown 22.

Examples of suitable inorganic color pigments are:
white pigments:
  titanium dioxide (C.I. Pigment White 6), zinc white, pigment grade zinc oxide; zinc sulfide, lithopone;
black pigments:
  iron oxide black (C.I. Pigment Black 11), iron manganese black, spinel black (C.I. Pigment Black 27); carbon black (C.I. Pigment Black 7);
chromatic pigments:
  chromium oxide, chromium oxide hydrate green; chrome green (C.I. Pigment Green 48); cobalt green (C.I. Pigment Green 50); ultramarine green;
  cobalt blue (C.I. Pigment Blue 28 and 36; C.I. Pigment Blue 72); ultramarine blue; manganese blue;
  ultramarine violet; cobalt violet and manganese violet;
  red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red;
  brown iron oxide (C.I. Pigment Brown 6 and 7), mixed brown, spinel phases and corundum phases (C.I. Pigment Brown 29, 31, 33, 34, 35, 37, 39 and 40), chromium titanium yellow (C.I. Pigment Brown 24), chrome orange;
  cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Examples of inorganic pigments typically used as fillers are transparent silicon dioxide, ground quartz, aluminum oxide, aluminum hydroxide, natural micas, natural and precipitated chalk and barium sulfate.

Luster pigments are platelet-shaped pigments having a monophasic or polyphasic construction whose color play is marked by the interplay of interference, reflection and absorption phenomena. Examples are aluminum platelets and aluminum, iron oxide and mica platelets bearing one or more coats, especially of metal oxides.

Component (B) of the pigment preparations according to the present invention is at least one surface-active additive from the group of the reaction products of alkylene oxides with a bisphenol of the formula I.

Said bisphenol I is preferably an unsubstituted bisphenol A ($R^1 = R^2 = -CH_3$). Substituted bisphenol A is particularly suitable as well, especially bisphenol A which has been reacted with styrene and is substituted by a total of 4 phenyl-1-ethyl radicals ortho to the two OH groups.

The alkylene oxides are preferably $C_2$–$C_4$-alkylene oxides, and more preferably ethylene oxide and propylene oxide.

Said bisphenol I can have been reacted with just one alkylene oxide or else with various alkylene oxides. When the reaction products are polymers, random polymers or preferably block copolymers can be formed when various alkylene oxides are used. Preferably, the bisphenol I is reacted first with propylene oxide and then with ethylene oxide, but the reactions may also be carried out in another order.

In general, the additives (B) contain from 4 to 150 mol of alkylene oxide per mole of bisphenol I.

Useful surface-active additives (B) are not only the nonionic alkylene oxide adducts themselves but also their acid sulfuric or sulfonic esters (obtained by reaction with sulfuric acid or sulfonic acid) and especially water-soluble salts thereof, especially alkali metal salts, in particular sodium salts, and ammonium salts. Such anionic additives (B) are based in particular on the above-described phenylethyl-substituted bisphenol A derivative.

The pigment preparations of the present invention preferably include the additives (B) in nonionic form.

Particularly preferred additives (B) are the reaction products of bisphenol A with propylene oxide and preferably with ethylene oxide that contain from 4 to 150 mol, especially from 4 to 100 mol and in particular from 4 to 50 mol of the alkylene oxide per mole of bisphenol A.

Such surface-active additives are known and are commercially available for example under the names of Pluriol® (BASF) and Atlas® (Uniqema).

The pigment preparations of the present invention include from 60 to 90% by weight and preferably from 70 to 85% by weight of component (A) and from 10 to 40% by weight, and preferably from 15 to 30% by weight of component (B).

The pigment preparations according to the present invention are advantageously obtainable by the production process of the invention by wet-comminuting the pigment (A) in aqueous suspension in the presence of some or all of additive (B) and then drying the suspension, if necessary after the rest of additive (B) has been added.

Pigment (A) can be used in the process of the present invention as a dry powder or in the form of a presscake.

The pigment (A) as used is preferably a finished product, ie the primary particle size of the pigment has already been adjusted to the desired application value. This finish is advisable in the case of organic pigments especially, since the as-synthesized crude material is generally not directly suitable for use. In the case of inorganic pigments, for example in the case of oxide and bismuth vanadate pigments, the primary particle size can also be adjusted in the course of the synthesis of the pigment, so that the as-synthesized pigment suspensions can be used directly in the process of the present invention.

Since the finished pigment (A) typically reagglomerates in the course of drying or on the filter assembly, it is subjected to wet comminution, for example grinding in a stirred media mill, in aqueous suspension.

The wet comminution should be carried out in the presence of at least a portion of the additive (B) for the ready-produced pigment preparation, and it is preferable to add the entire amount of additive (B) prior to the wet comminution.

The particle size of the pigment preparations of the present invention can be controlled to a specific value, depending on the chosen method of drying—spray granulation and fluidized bed drying, spray drying, drying in a paddle dryer, evaporation and subsequent comminution.

Spray and fluidized bed granulation may produce coarsely divided granules having average particle sizes from 50 to 5 000 µm, and especially from 100 to 1 000 µm. Spray drying typically produces granules having average particle sizes <20 µm. Finely divided preparations are obtainable by drying in a paddle dryer and by evaporation with subsequent grinding. Preferably, however, the pigment preparations of the present invention are in granule form.

Spray granulation is preferably carried out in a spray tower using a one-material nozzle. Here, the suspension is sprayed in the form of relatively large drops, and the water evaporates. The additive (B) melts at the drying temperatures and so leads to the formation of a substantially spherical granule having a particularly smooth surface (BET values generally $\leqq 15$ m$^2$/g, and especially $\leqq 10$ m$^2$/g).

The gas inlet temperature in the spray tower is generally in the range from 180 to 300° C. and preferably in the range from 150 to 300° C. The gas outlet temperature is generally in the range from 70 to 150° C. and preferably in the range from 70 to 130° C.

The residual moisture content of the granular pigment obtained is preferably <2% by weight.

The pigment preparations of the present invention are notable in use for their excellent color properties which are comparable to those of liquid pigment formulations, especially with regard to color strength, brilliance, hue and hiding power, and in particular for their stir-in characteristics, ie they can be dispersed in application media with a minimal input of energy, simply by stirring or shaking. This applies in particular to the coarsely divided pigment granules, which constitute the preferred embodiment of the pigment preparations of the present invention. Compared with liquid pigment formulations, the pigment preparations of the present invention additionally have the following advantages: They have a higher pigment content. Whereas liquid formulations tend to change viscosity during storage and have to be admixed with preservatives and agents for enhancing the resistance to freezing and/or drying out (crusting), the pigment preparations of the present invention exhibit very good stability in storage. They are both economically and ecologically advantageous with regard to packaging, storage and transportation. Since they are solvent free, they are more flexible in use.

The pigment preparations of the present invention which are in granule form are notable for excellent attrition resistance, a minimal tendency to compact or clump, uniform particle size distribution, good pourability, flowability and meterability and also dustlessness in handling and application.

The pigment preparations of the present invention are very useful for pigmenting macromolecular organic and inorganic materials of any kind. Liquid application media in this context can be purely aqueous; comprise mixtures of water and organic solvents, for example alcohols; or be based exclusively on organic solvents, such as alcohols, glycol ethers, ketones, eg methyl ethyl ketone, amides, eg N-methylpyrrolidone and dimethylformamide, esters, eg ethyl acetate, butyl acetate and methoxypropyl acetate, or aromatic or aliphatic hydrocarbons, eg xylene, mineral oil and mineral spirits.

If desired, the preparations can initially be stirred into a solvent which is compatible with the particular application medium, again with minimal input of energy, and then be introduced into this application medium. For instance, slurries of pigment preparations in glycols or other solvents customary in the paint and coatings industry, such as methoxypropyl acetate, can be used to render the pigment preparations for aqueous systems compatible with hydrocarbonaceous systems or systems based on nitrocellulose.

Examples of materials which can be pigmented with the pigment preparations of the present invention include: coatings, for example architectural coatings, industrial coatings, automotive coatings, radiation-curable coatings; paints, including paints for building exteriors and building interiors, for example wood paints, lime washes, distempers, emulsion paints; solventborne printing inks, for example offset printing inks, flexographic printing inks, toluene gravure printing inks, textile printing inks, radiation-curable printing inks; waterborne inks, including inkjet inks; color filters; building materials (water is typically added only after building material and granular pigment have been dry mixed), for example silicate render systems, cement, concrete, mortar, gypsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry; cosmetic articles; detergents.

The pigment preparations of the present invention are particularly useful as mixing components in color-mixing or -matching systems. Owing to their stir-in characteristics, they can be used directly as a solid for this purpose. If desired, however, they can also be first converted into base colors, mixing varnishes and tinting colors (especially into colors having a high solids content, "HS colors"), or even more highly pigmented tinting pastes which then constitute the components of the mixing system. The matching of the desired hue and hence the mixing of the color components can be effected visually via a system of color cards in a very large number of hue gradations which are based on color standards, such as RAL, BS and NCS, or preferably under computer control, whereby an unlimited number of hues become accessible ("computer color matching").

The pigment preparations of the present invention are also very useful for pigmenting plastics and powder coatings. They may be incorporated into the plastics and powder coatings by extruding, rolling, kneading or grinding.

EXAMPLES

Making and testing of granular pigment preparations according to the present invention The pigment granules were made by a suspension of x kg of finished pigment (A) and y kg of additive (B) in 150 kg of water being ball milled to a $d_{50}$ value of <1 μm and then spray granulated in a spray tower using a one-material nozzle at a gas inlet temperature of 165° C. and a gas outlet temperature of 70° C.

The additives used were as follows:

B1: ethoxylated bisphenol A (15 mol of EO/mol of bisphenol A).

B2: Monosulfated ethoxylated tetraphenylethyl-substituted bisphenol A (100 mol of EO/mol of bisphenol A; U.S. Pat. No. 4,218,218: surfactant 13).

The color strength of the pigment granules was determined colorimetrically in the white reduction (reported in terms of the DIN 55986 coloring equivalents CEs) in a waterborne emulsion paint. To this end, a mixture of in each case 1.25 g of granular pigment and 50 g of a waterborne styrene-acrylate-based test binder having a white pigment content of 16.4% by weight (TiO$_2$, Kronos 2043) (BASF test binder 00-1067) were homogenized in a 150 ml plastic beaker by running a high speed stirrer at 1 500 rpm for 3 min. The color obtained was then drawn down on a black and white test card using a 100 μn wire-wound film applicator and dried for 30 min.

The respectively corresponding emulsion paints made using commercially available aqueous formulations of the pigments were each assigned the CE value of 100 (standard). CE values <100 mean a higher color strength than that of the standard, CE>100 accordingly a lower color strength.

In addition, the color strength was assessed after five days of storage at 40° C.

The table hereinbelow lists the compositions of the pigment granules produced and the CE values obtained in each case.

TABLE

| | Pigment | | Additive | | CE | |
|---|---|---|---|---|---|---|
| Ex | (A) | x kg | (B) | y kg | instantly | 5 d/40° C. |
| 1 | P.V. 23 | 78 | B1 | 22 | 100 | 100 |
| 2 | P.V. 23 | 78 | B2 | 22 | 100 | 100 |
| 3 | P.R. 122 | 75 | B1 | 25 | 98 | 99 |
| 4 | P.R. 122 | 75 | B2 | 25 | 100 | 100 |
| 5 | P.Y. 74 | 77 | B1 | 23 | 100 | 100 |
| 6 | P.Y. 74 | 77 | B2 | 23 | 105 | 105 |

The invention claimed is:

1. A solid pigment preparation comprising
(A) from 60 to 90% by weight of at least one pigment and
(B) from 10 to 40% by weight of at least one surface-active additive from the group of the reaction products of alkylene oxides with a bisphenol of the general formula I

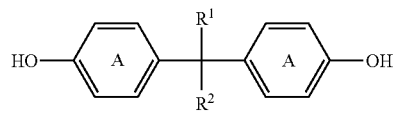

where the rings A may each be substituted by one or two substituents selected from the group consisting of $C_1$–$C_8$-alkyl, phenyl and phenyl-$C_1$–$C_8$-alkyl and $R^1$ and $R^2$ are each methyl.

2. A solid pigment preparation as claimed in claim 1, wherein component (B) is at least one additive selected from the group consisting of the reaction products of ethylene oxide and/or propylene oxide with bisphenol A and phenylethyl-substituted bisphenol A, the acidic sulfuric and sulfonic esters of these alkylene oxide compounds and the salts of these esters.

3. A solid pigment preparation as claimed in claim 1, wherein component (B) is at least one nonionic surface-active additive based on reaction products of bisphenol A with from 4 to 150 mol of ethylene oxide/mol.

4. A solid pigment preparation as claimed in claim 1, in the form of granules having an average particle size from 50 to 5000 μm and a BET surface area ≦15 m$^2$/g.

5. A process for producing a solid pigment preparation as claimed in claim 1, comprising wet-comminuting the pigment (A) in aqueous suspension in the presence of some or all of additive (B) and then drying the suspension, if necessary after the rest of additive (B) has been added.

6. A process for pigmenting macromolecular organic and inorganic materials, comprising introducing the solid pigment preparation as claimed in claim 1 into said macromolecular organic and inorganic materials by stirring or shaking.

7. The process as claimed in claim 6, wherein said macromolecular and inorganic materials include pigmenting coatings, paints, inks, including printing inks, and finish systems and wherein a liquid phase of said macromolecular and inorganic materials comprises water, organic solvent or mixtures of water and organic solvents.

8. A process for pigmenting macromolecular organic and inorganic materials using color-mixing systems, comprising incorporating into said materials the solid pigment preparation as claimed in claim 1 as a mixing component.

9. A process for pigmenting plastics, comprising incorporating the solid pigment preparation as claimed in claim 1 into the plastics by extruding, rolling, kneading or milling.

10. A process for pigmenting powder coatings, comprising incorporating the solid pigment preparation as claimed in claim 1 into the powder coatings by extruding, rolling, kneading or milling.

* * * * *